C. S. GREENE & L. W. NORTON.
HEN'S NEST.
APPLICATION FILED MAR. 28, 1911.
1,037,756.
Patented Sept. 3, 1912.
2 SHEETS—SHEET 1.
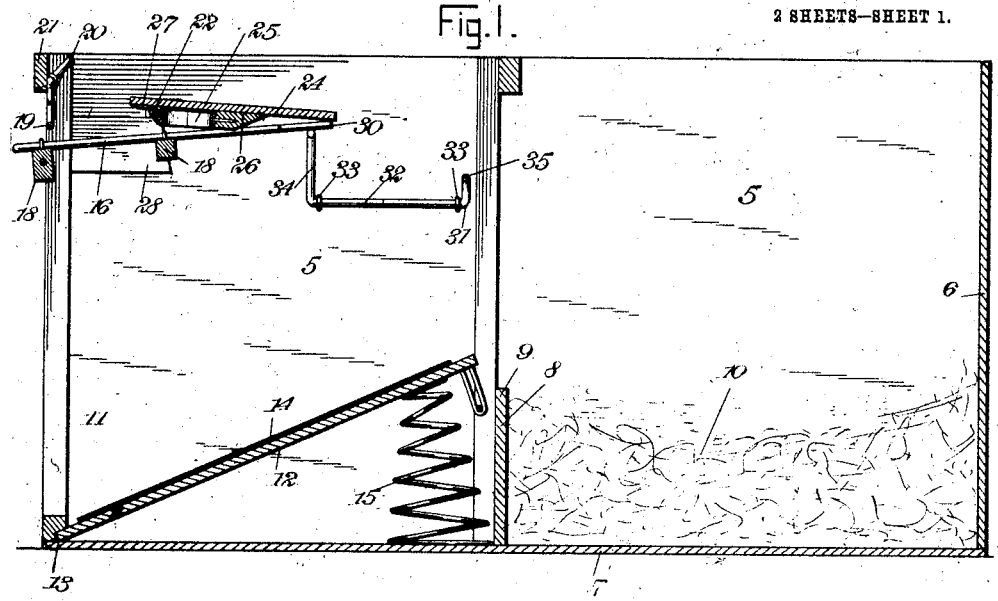
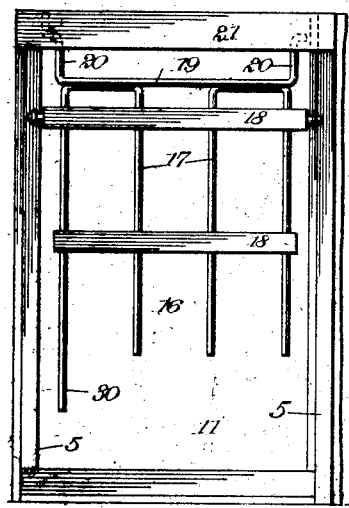 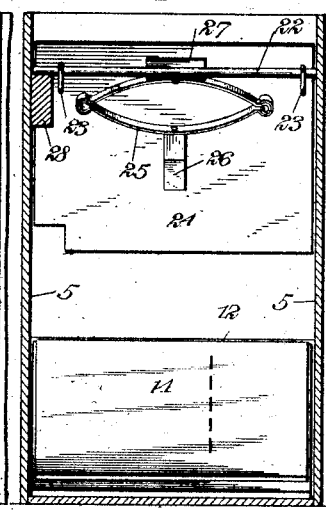 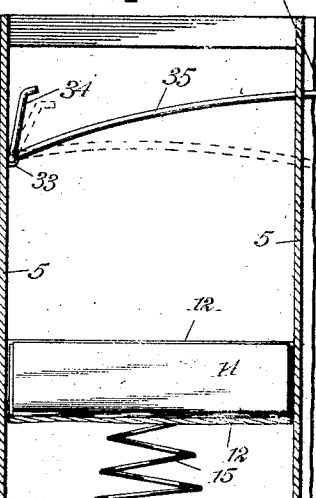
WITNESSES:
INVENTOR
Charles S. Greene
Lionel W. Norton
BY
ATTORNEYS C. S. GREENE & L. W. NORTON.
HEN'S NEST.
APPLICATION FILED MAR. 28, 1911.
1,037,756.
Patented Sept. 3, 1912.
2 SHEETS—SHEET 2.
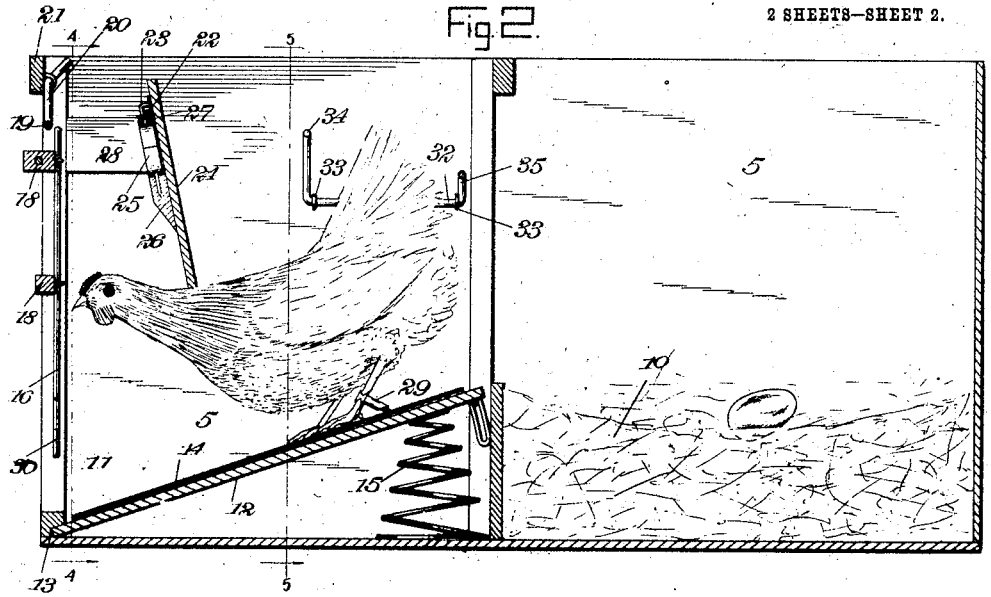
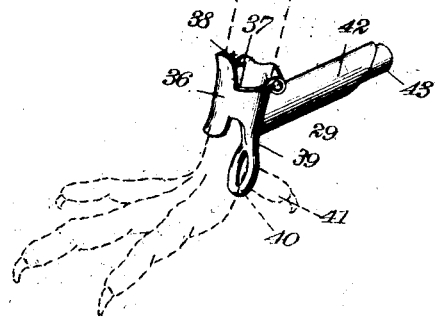
WITNESSES:
INVENTOR
Charles S Greene
Lionel W. Norton.
BY
Munn Co.
ATTORNEYS

UNITED STATES PATENT OFFICE.

CHARLES S. GREENE AND LIONEL W. NORTON, OF NEW YORK, N. Y.

HEN'S NEST.

1,037,756.   Specification of Letters Patent.   Patented Sept. 3, 1912.

Application filed March 28, 1911. Serial No. 617,354.

*To all whom it may concern:*

Be it known that we, CHARLES S. GREENE and LIONEL W. NORTON, citizens of the United States, and residents of the city of New York, West Brighton, borough of Richmond, in the county of Richmond and State of New York, have invented a new and Improved Hen's Nest, of which the following is a full, clear, and exact description.

Our invention relates to hens' nests, and it has for its object to provide one having an inviting appearance when open, and which permits a hen to enter freely, the nest having a door which closes automatically when a hen enters, to prevent another hen from entering, but which permits the hen which has entered to leave the nest.

Another object of the invention is to provide means for recording the passage of a hen, so that the poultryman can tell, at a glance, which hen entered the nest, by which means he is able to inform himself as to which hen laid the egg found in the nest.

Still other objects of the invention will appear in the following complete specification, in which the preferred form of our invention is disclosed.

In the drawings similar characters of reference indicate corresponding parts in all the views, in which—

Figure 1 is a longitudinal elevation showing the nest in an open position; Fig. 2 is a similar view showing the nest closed, and with the hen which has laid the egg about to leave the nest; Fig. 3 is a front elevation of the nest; Fig. 4 is a sectional view on the line 4—4 of Fig. 2; Fig. 5 is a sectional view on the line 5—5 of Fig. 2; and Fig. 6 is a view showing the marking device, which is secured to one of the hen's legs.

By referring to the drawings it will be seen that the nest has side members 5, a rear wall 6, a floor member 7, and a partition 8, having an opening 9. The compartment formed by the side walls 5, the rear wall 6 and the partition 8 is supplied with straw or similar material 10. In front of the said compartment there is a passageway 11, through which the hen passes on the way to and from the said compartment. Disposed in this compartment 11 there is an inclined bottom member 12, pivoted at 13 at the front of the nest, a pad or recording member 14 being placed on this inclined bottom member 12. The inner end of the inclined bottom member 12 is held yieldingly upward, by means of the spring 15. At the front of the nest, between its side walls, there is pivoted a gate 16, the gate 16 being pivoted at its top so that it will fall by gravity when not supported. This gate 16 is constructed of vertical wire members 17, which are held in position relatively to each other by the transverse wooden members 18, the upper wooden member 18 being pivoted to the side walls 5 as described. The vertical members 17 extend above the upper transverse wooden member 18, so that they may be engaged by a wire member 19, the terminals 20 of which are bent upwardly, and are pivoted at the inside of a transverse member 21, the ends of which are secured to the side members 5 of the nest. As will best be seen by referring to Fig. 2 of the drawings, the outward movement of this pivoted wire member 19 is normally prevented by the transverse member 21.

Behind the gate 16 and the pivoted wire member 19 a transverse rod 22 is disposed, the terminals of this rod 22 being secured to the sides 5 of the nest. This transverse rod 22 is disposed in guideways 23, which are secured to the member 24, a spring 25 being secured to a member 26, which is secured to the said member 24, this spring 25 having a plate 27, which presses up against the transverse rod 22, to hold the member 24 yieldingly downwardly, while permitting its rotation. To one of the sides 5 of the nest is secured a stop 28, for limiting the forward movement of the said member 24.

Pivoted in the passageway 11 in one of the side members 5 of the nest there is a trip 31, having a central portion 32, which is disposed against the side member 5, and is pivoted thereto by the eye members 33, which are secured to the said side member. This trip 31 has two arms 34 and 35, the arm 34 being adapted to support a wire member 30 of the gate 16, the arm 35 being disposed across the opening 9, leading from the passageway 11 to the compartment.

In Fig. 6 of the drawings we show a marking device 29, having a band 36, with a slot 37, and a terminal 38, adapted to be disposed in the slot, and turned over to hold the said band 36 around the leg of the hen. This marking device 29 has a depending portion 39, with an eye 40, in which the toe 41 of the chicken is disposed. Secured to and extending rearwardly from the band 36, there is a cylindrical member 42, in which a crayon 43 is disposed. The top of this cylindrical member 42 extends beyond its lower portion to protect the said crayon.

In using the invention a number of marking devices 29 are provided, each with a different color crayon 43, and these marking devices are secured, one to a leg of each of the hens. The pivoted wire member 19 is then moved to permit the gate 16 to be moved rearwardly, the gate pushing upwardly the member 24, as it is supported by the arm 34 of the trip member 31, the vertical wire member 30 being disposed above the arm 34, which serves as a support. The arm 35 extends across the passage 11, and its terminal 35ª is disposed in a slot in the nest, so that it may be readily moved upwardly by a hen passing through the passageway 11 on her way to the compartment supplied with the straw 10. As the hen enters, she walks up on the inclined bottom member 12, pressing the arm 35, which moves upwardly the arm 34, which frees the wire member 30 of the gate, thereby permitting the gate to fall and with it the member 24. As the gate falls, its lower portion moves outwardly beyond the wall of the nest, and its upper portion raises the pivoted wire member 19, until its said upper portion is disposed against the inner side of the said pivoted wire member 19, which prevents the gate from opening inwardly until it is again set. The hen having passed through the passageway 11, enters the compartment provided with the straw 10, where she lays the egg. As the hen leaves the nest, she walks down the inclined bottom member 12, provided with the recording member 14, and as it is necessary for her to squat to pass under the member 24, the crayon 23 on the marking device is pressed against the recording member 14, thereby making a mark thereon.

In order that the same nest may be operated by hens of different sizes, the bottom member 12 is pivoted, and is supported by the spring 15, and, at the same time, the member 24 may be moved yieldingly upwardly, as the hen passes outwardly, between the bottom member 12 and the said member 24. As the upper end of the gate 16 is disposed at the inner side of the pivoted wire member 19, the gate may be readily pushed outwardly by the hen, although it is impossible for another hen to move it inwardly. We propose to use a number of these nests, for each flock of hens, so that the poultrymen may gather up the recording members 14 at the end of the day, at the same time that the eggs are collected, and by examining the recording members, determine which hens have laid the eggs and which hens have entered the nests and have passed outwardly again without laying eggs.

As will be seen by referring to Figs. 3, 4 and 5, of the drawings, the passageway 11 leading to the compartment containing the straw 10 may be made narrower than the compartment to prevent the hen from turning around in the passageway.

Having thus described our invention, we claim as new and desire to secure by Letters Patent:

1. A nest having an inclined bottom board for supporting a record receiving means for coöperating with a marking device carried by a fowl, and a member spaced from the bottom board to cause the fowl to squat and bring the marking device into engagement with the record receiving means.

2. In a nest for fowls a marking device adapted to be carried by a fowl, a nest having an opening with a record receiving member on the bottom thereof, and a member disposed in the opening, spaced from the bottom, to cause the fowl to move to bring the marking device into engagement with the record receiving member.

3. In a nest for fowls a marking device adapted to be carried by a fowl, a nest having an opening with a record receiving member on the bottom thereof, and a member disposed in the opening and spaced from the bottom member, for causing the fowl to move to bring the marking device into engagement with the record receiving member, and means for holding the said member yieldingly downwardly.

4. In a nest for fowls a marking device adapted to be carried by a fowl, a nest having an opening, an inclined bottom board in the opening, having a record receiving member, a member disposed in the opening, spaced from the inclined bottom board to cause a fowl to squat to bring the marking device into engagement with the record receiving member.

5. A nest having an opening, a bottom board in the opening having a record receiving means, resilient means for holding the bottom board yieldingly upward, a member disposed in the opening and spaced from the bottom board for causing a fowl passing in through the opening to squat, and a marking device adapted to be carried by the fowl for coöperating with the record receiving means.

6. A nest having an opening, an inclined bottom board in the opening having record receiving means, resilient means for holding the bottom board yieldingly upward, a member disposed in the opening and spaced from the bottom board for causing a fowl passing through the opening to squat, and a marking device adapted to be carried by a fowl for coöperating with the record receiving means.

7. A nest having an opening, a bottom board in the opening having a record receiving means, resilient means for holding the bottom board yieldingly upward, a member disposed in the opening and spaced from the bottom board for causing a fowl passing through the opening to squat, resilient means for holding the member in position, and a marking device adapted to be carried by a fowl for coöperating with the record-receiving means.

8. An impressing member, an impression receiving member coöperating therewith, a nest having an opening and a bottom member, a member disposed in the opening in the path of a fowl entering the nest, and spaced from the bottom member to cause the fowl to squat, one of the first-two-mentioned members being mounted on the bottom member, the other of the said first-two-mentioned members being adapted to be carried by a fowl.

9. A nest having a bottom member for supporting a record receiving means for coöperating with a marking device carried by a fowl, a pivoted gate, a member spaced from the bottom member and pivoted in the nest adapted to be engaged and held in a predetermined position by the gate, the pivoted member being normally disposed in the path of the fowl for causing the fowl to squat and bring the marking device into engagement with the record receiving means, resilient means for normally holding the pivoted member in a predetermined position, and a member for holding the gate in a predetermined position, adapted to be operated by the fowl.

10. A nest having a bottom member for supporting a record receiving means for coöperating with a marking device carried by a fowl, a pivoted gate, a rod secured to the nest, a member normally disposed in the path of the fowl for causing the fowl to squat and bring the marking device into engagement with the record receiving means, a member having guideways in which the rod is disposed and adapted to be engaged by the pivoted gate, a resilient means secured to the second-mentioned member for pressing against the rod for holding the second-mentioned member yieldingly in a predetermined position, and a member for holding the gate in a predetermined position adapted to be operated by the fowl.

11. A nest having an inclined bottom member for supporting a record receiving means for coöperating with a marking device carried by a fowl, a pivoted gate, a member normally disposed in the path of the fowl for causing the fowl to squat and bring the marking device into engagement with the record receiving means, the second-mentioned member being pivoted in the nest and adapted to be engaged by the gate, and a member for holding the gate open adapted to be operated by the fowl.

12. A nest having a bottom member for supporting a record receiving means for coöperating with a marking device carried by a fowl, a pivoted gate, resilient means for holding the bottom member yieldingly upward, a member for causing a fowl to squat and bring the marking device into engagement with the record receiving means, the second-mentioned member being pivoted in the nest and adapted to be engaged by the gate and held longitudinally of the nest when the gate is in an open position, and a member for engaging the gate and holding it open, adapted to be operated by the fowl.

13. A nest having a bottom member for supporting a record receiving means for coöperating with a marking device carried by a fowl, a pivoted gate, a member normally disposed in the path of the fowl for causing the fowl to squat and bring the marking device into engagement with the record receiving means, the second-mentioned member being pivoted in the nest and adapted to be engaged by the gate, and a member for holding the gate open, adapted to be operated by the fowl.

14. A nest having a bottom member with a record receiving means, a gate pivoted to the nest, a member pivoted in the nest, normally disposed in the path of a fowl for causing the fowl to squat, and adapted to be engaged by the gate, a member adapted to be operated by the fowl for holding the gate in an open position, and a marking device adapted to be carried by a fowl for engaging the record receiving means.

15. A marking device having a band adapted to be disposed around the leg of a fowl, an eye through which the toe of the fowl may be disposed, and an indicating means.

16. A marking device having a band adapted to be disposed around the leg of a fowl, an eye through which the toe of the fowl may be disposed, a holder, and a crayon secured by the holder.

17. A nest having a bottom member for supporting a record receiving means for coöperating with a marking device carried by a fowl, a pivoted gate, a member spaced from the bottom member and pivoted in the nest for causing the fowl to squat and bring the marking device into engagement with the record receiving means, the second-mentioned member being adapted to be engaged and held in a predetermined position by the gate, and normally disposed in the path of the fowl, and a member for holding the gate in a predetermined position adapted to be operated by the fowl.

18. A nest having a bottom member for supporting a record receiving means for coöperating with a marking device carried by a fowl, a pivoted gate, a rod secured to the nest, a member normally disposed in the path of a fowl for causing the fowl to squat and bring the marking device into engagement with the record receiving means, the second-mentioned member having guideways in which the rod is disposed, and adapted to be engaged by the pivoted gate, and a member for engaging the pivoted gate and holding it in a predetermined position, adapted to be operated by the fowl.

19. A nest having a bottom member for supporting a record receiving means for coöperating with a marking device carried by a fowl, a member disposed above the bottom member and in the path of the fowl for causing the fowl to squat and bring the marking device into engagement with the record receiving means, the second-mentioned member being pivoted in the nest, and means for holding the second-mentioned member in a predetermined position.

20. A nest having a bottom member for supporting a record receiving means for coöperating with a marking device carried by a fowl, and a member disposed above the bottom member and in the path of the fowl for causing the fowl to squat and bring the marking device into engagement with the record receiving means.

In testimony whereof we have signed our names to this specification in the presence of two subscribing witnesses.

CHARLES S. GREENE.
LIONEL W. NORTON.

Witnesses:
WILLIAM TAYLOR,
PAUL CALDWELL.